(12) United States Patent
Sela et al.

(10) Patent No.: US 8,908,510 B2
(45) Date of Patent: Dec. 9, 2014

(54) COMMUNICATION LINK WITH INTRA-PACKET FLOW CONTROL

(75) Inventors: Oren Tzvi Sela, Rosh Pina (IL); Ran Ravid, Tel Aviv (IL)

(73) Assignee: Mellanox Technologies Ltd., Yokneam (IL)

(*) Notice: Subject to any disclaimer, the term of this patent is extended or adjusted under 35 U.S.C. 154(b) by 0 days.

(21) Appl. No.: 13/426,748

(22) Filed: Mar. 22, 2012

(65) Prior Publication Data
US 2013/0250760 A1 Sep. 26, 2013

(51) Int. Cl.
*G08C 15/00* (2006.01)

(52) U.S. Cl.
USPC .......................................... 370/230; 370/528

(58) Field of Classification Search
USPC .......... 370/229, 230, 231, 410, 522, 528, 236
See application file for complete search history.

(56) References Cited

U.S. PATENT DOCUMENTS

| | | | |
|---|---|---|---|
| 5,649,122 A * | 7/1997 | Wegner et al. ............... | 710/105 |
| 6,633,564 B1 * | 10/2003 | Steer et al. ................... | 370/389 |
| 6,876,669 B2 | 4/2005 | Shalom | |
| 7,000,025 B1 | 2/2006 | Wilson | |
| 7,330,734 B2 | 2/2008 | Shpak | |
| 7,539,142 B1 * | 5/2009 | Gurley et al. ................ | 370/235 |
| 7,554,908 B2 * | 6/2009 | Jain et al. ..................... | 370/230 |
| 7,561,523 B1 * | 7/2009 | Revsin et al. ................ | 370/236 |
| 7,567,513 B2 * | 7/2009 | Cho ............................. | 370/235 |
| 7,590,124 B2 * | 9/2009 | O'Mahony ............... | 370/395.64 |
| 7,602,712 B2 | 10/2009 | Johnsen et al. | |
| 7,912,911 B2 * | 3/2011 | Way et al. .................... | 709/206 |
| 7,969,873 B2 * | 6/2011 | Rozental ...................... | 370/230 |
| 8,000,278 B2 * | 8/2011 | Costo et al. .................. | 370/311 |
| 8,325,599 B2 * | 12/2012 | Matsumoto et al. ......... | 370/229 |
| 8,416,687 B1 * | 4/2013 | Hutchison .................... | 370/230 |
| 8,751,881 B1 * | 6/2014 | Terry et al. ................... | 714/708 |
| 2001/0043603 A1 * | 11/2001 | Yu ................................ | 370/393 |
| 2001/0048671 A1 * | 12/2001 | Kelly et al. .................. | 370/316 |
| 2002/0019904 A1 * | 2/2002 | Katz ............................ | 710/316 |
| 2002/0097676 A1 * | 7/2002 | Matsumaru .................. | 370/230 |
| 2002/0167945 A1 * | 11/2002 | Shin et al. .................... | 370/389 |
| 2005/0259575 A1 * | 11/2005 | Krishnamurthi et al. ..... | 370/229 |
| 2006/0007862 A1 * | 1/2006 | Sayeedi et al. ............... | 370/235 |
| 2006/0092837 A1 * | 5/2006 | Kwan et al. .................. | 370/229 |
| 2006/0109864 A1 * | 5/2006 | Oksman ....................... | 370/474 |
| 2007/0047572 A1 * | 3/2007 | Desai et al. .................. | 370/463 |
| 2010/0067377 A1 * | 3/2010 | Wang et al. .................. | 370/230 |
| 2010/0138573 A1 * | 6/2010 | Sano et al. .................... | 710/106 |
| 2011/0110236 A1 * | 5/2011 | Kadambi et al. ............. | 370/235 |
| 2011/0205897 A1 * | 8/2011 | Pritam ......................... | 370/235 |
| 2012/0218891 A1 * | 8/2012 | Sundararajan et al. ....... | 370/231 |

OTHER PUBLICATIONS

U.S. Appl. No. 13/304,654 Office Action dated Nov. 6, 2013.

* cited by examiner

*Primary Examiner* — Paul H. Masur
*Assistant Examiner* — Michael Phillips
(74) *Attorney, Agent, or Firm* — D. Kigler I.P. Services Ltd.

(57) ABSTRACT

A method for communication includes transmitting a data packet from a first port to a second port over a communication link. After transmission of a first portion of the data packet, the transmission is temporarily suspended, a flow-control message is sent from the first port to the second port over the communication link while the transmission is temporarily suspended, and then the transmission is resumed so as to transmit a second portion of the data packet.

26 Claims, 2 Drawing Sheets

COMMUNICATION LINK WITH INTRA-PACKET FLOW CONTROL

FIELD OF THE INVENTION

The present invention relates generally to data communication, and particularly to methods and systems for flow control in communication links.

BACKGROUND OF THE INVENTION

Data communication networks use various communication protocols that are based on packet transmission, such as Ethernet® and Infiniband®. Communication nodes such as switches and Network Interface Cards (NICs) sometimes use flow control mechanisms for regulating the transmission of packets over communication links.

SUMMARY OF THE INVENTION

An embodiment of the present invention that is described herein provides a method for communication. The method includes transmitting a data packet from a first port to a second port over a communication link. After transmission of a first portion of the data packet, the transmission is temporarily suspended, a flow-control message is sent from the first port to the second port over the communication link while the transmission is temporarily suspended, and then the transmission is resumed so as to transmit a second portion of the data packet.

In some embodiments, sending the flow-control message includes requesting the second port to regulate data transfer over the communication link from the second port to the first port. In an embodiment, suspending the transmission includes appending a suspension marker to the first portion of the data packet. In a disclosed embodiment, resuming the transmission includes preceding the second portion of the data packet with a resumption marker.

In another embodiment, suspending the transmission includes pausing the transmission for no more than a maximum predefined suspension period, and resuming the transmission includes continuing the transmission upon expiry of the maximum predefined suspension period.

In some embodiments, suspending the transmission includes evaluating a suspension condition, and suspending the transmission only when the suspension condition is met. Evaluating the suspension condition may include identifying that the second portion of the data packet exceeds a predefined size, and/or identifying that the flow-control message is assigned a priority level that is higher than a predefined priority threshold.

In some embodiments, the method includes receiving the first and second portions at the second port, and reassembling the data packet from the received first and second portions. The method may include, at the second port, regulating data transfer over the communication link from the second port to the first port in response to the flow-control message, and simultaneously processing the reassembled data packet.

In an embodiment, the method includes forwarding the reassembled data packet from the second port to a subsequent destination. In a disclosed embodiment, forwarding the reassembled data packet includes buffering at least part of the data packet at the second port so as to forward the first and second portions contiguously to one another. In an alternative embodiment, forwarding the reassembled data packet includes inserting into the reassembled data packet dummy data between the first and second portions, and forwarding the data packet including the dummy data. In an embodiment, suspending the transmission includes pausing the transmission for no more than a maximum predefined suspension period, and forwarding the reassembled data packet includes forwarding the data packet including the suspension period.

There is additionally provided, in accordance with an embodiment of the present invention, a communication apparatus including a port and control circuitry. The port is connected to a remote port by a communication link and is configured to transmit a data packet to the remote port over the communication link. The control circuitry is coupled to the port and is configured to temporarily suspend the transmission of the data packet after transmission of a first portion of the data packet, to send a flow-control message to the remote port over the communication link while the transmission is temporarily suspended, and then to resume the transmission so as to transmit a second portion of the data packet.

There is also provided, in accordance with an embodiment of the present invention, a method for communication. The method includes receiving over a communication link a first portion of a data packet, followed by a flow-control message, followed by a second portion of the data packet. The data packet is reassembled from the first and second received portions and processing the reassembled data packet. The flow-control message is extracted and executed.

There is further provided, in accordance with an embodiment of the present invention, a communication apparatus including a port and control circuitry. The port is configured to receive over a communication link a first portion of a data packet, followed by a flow-control message, followed by a second portion of the data packet. The control circuitry is coupled to the port and is configured to reassemble the data packet from the first and second received portions and, to process the reassembled data packet, and to extract and execute the flow-control message.

The present invention will be more fully understood from the following detailed description of the embodiments thereof, taken together with the drawings in which:

DETAILED DESCRIPTION OF EMBODIMENTS

Overview

Communication equipment in data communication networks, such as switches and Network Interface Cards (NICs), typically comprise ports that communicate with one another over bidirectional communication links. In a bidirectional communication link, a first port may send to a second port flow-control messages that request the second port to regulate (e.g., suspend, resume or throttle) transmission of packets to the first port. Flow-control mechanisms of this sort may be used, for example, to prevent overflow in a receive buffer of the first port.

In some practical cases, a flow-control message may be initiated in the first port while a packet is already being transmitted from the first port to the second port. It is possible in principle to delay transmission of the flow-control message until the packet transmission is completed. This delay, however, would postpone the time at which the second port will react to the flow-control message. When using such a solution, the size of the first port receive buffer would depend on the maximum packet size that may be transmitted from the first port to the second port.

Embodiments of the present invention that are described below provide improved methods and systems for flow control over communication links. In the disclosed embodiments, control circuitry that is coupled to the first port may temporarily suspend transmission of a packet in order to allow a flow-control message to be sent to the second port with small latency. After the flow-control message is transmitted, the control circuitry resumes transmission of the packet. The control circuitry coupled to the second port is configured to reconstruct the packet regardless of the temporary suspension.

The disclosed temporary suspension scheme reduces the latency of the second port in responding to flow-control messages, without degrading bandwidth. Consequently, the size of the receive buffer in the first port may be reduced, thereby reducing latency, size, cost and power consumption. This technique is particularly suitable for applications involving large packets, and asymmetric communication links in which the link direction from the first port to the second port is allocated smaller bandwidth than the opposite direction.

Several example methods for temporary suspension of packets, and for inserting flow-control messages into suspended packets, are described herein. Methods for onward forwarding of suspended packets are also described. The disclosed techniques can be used in a variety of network types and protocols, such as Ethernet or Infiniband.

System Description

Figure 1:
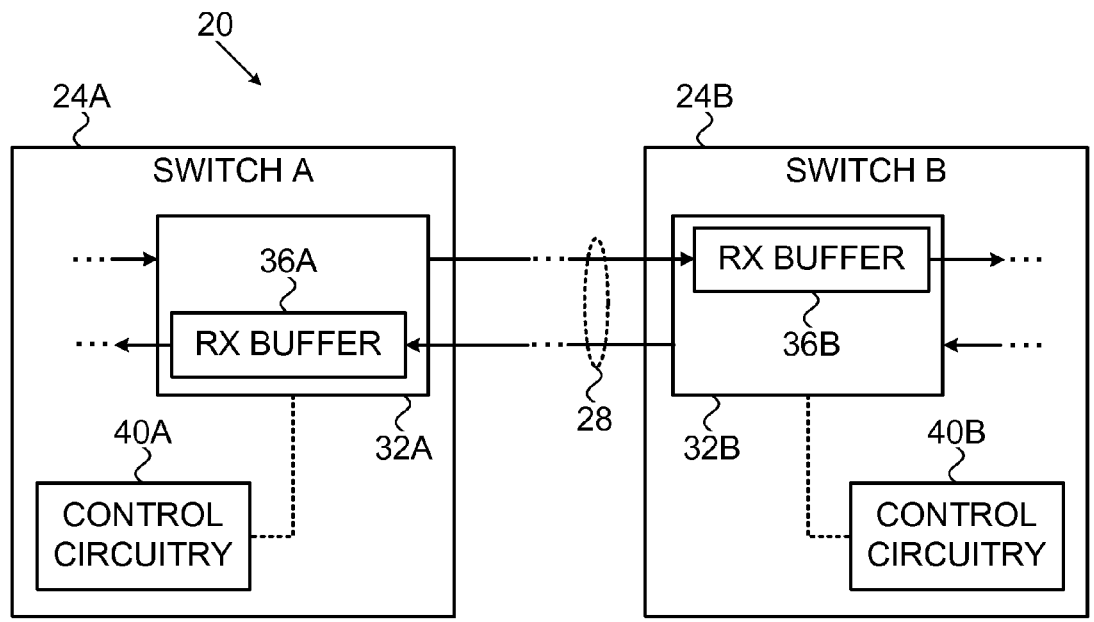
FIG. 1 is a block diagram that schematically illustrates a data communication system, in accordance with an embodiment of the present invention.

FIG. 1 is a block diagram that schematically illustrates a data communication system 20, in accordance with an embodiment of the present invention. In the present example, system 20 comprises two network switches 24A and 24B denoted SWITCH A and SWITCH B, respectively, which communicate with one another over a bidirectional communication link 28. Communication over link 28 is carried out using a port 32A in switch 24A and a port 32B in switch 24B. FIG. 1 shows only a single port in each switch for the sake of clarity—Real-life network equipment typically comprises multiple ports.

In alternative embodiments, the disclosed techniques can be used in any other suitable type of communication equipment that comprises ports for communicating over communication links, such as in NICs, routers or gateways. Packet transmission over link 28 may be performed in accordance with any suitable communication protocol, such as, for example, Ethernet, Infiniband, Fibre Channel and PCI-express. Link 28 may be implemented over any suitable communication medium, such as copper, optical fiber or a wireless medium.

The embodiments described herein refer to communication of packets. In context of the present patent application and in the claims, however, the term "packet" is used in a broad sense and means various types of data units that are transmitted in communication systems and networks, such as packets, frames or cells, for example.

Switches 24A and 24B communicate by sending data packets to one another over link 28 using ports 32A and 32B. In some embodiments, link 28 is asymmetric, meaning that the bandwidth in one link directions is different from the bandwidth in the opposite link direction. Generally, the bandwidth in either link direction may change dynamically over time.

In the present example, each port comprises a respective receive buffer (buffer 36A in port 32A and buffer 36B in port 32B) for buffering incoming data until the port is ready to process it. Each switch comprises respective control circuitry (circuitry 40A in switch 24A and circuitry 40B in switch 24B) for controlling and configuring the switch ports, including the receive buffers.

In addition to data packets, in some embodiments ports 36A and 36B send to one another flow-control messages. The flow-control messages sent by a port instruct the peer port to regulate the transmission of data packets, for example to stop transmission, to resume transmission or to throttle (e.g., increase or decrease) the transmission rate. Flow-control instructions can be used, for example, to protect the ports from packet loss caused by overflow of the receive buffers.

Ports 32A and 32B may exchange any suitable kind of flow-control messages. In one embodiment, the flow-control instructions signal the peer port to temporarily pause packet transmission (for example when the receive buffer fill level exceeds a certain maximum threshold) and to resume transmission (for example when the receive buffer fill level falls below a certain minimum threshold). This mechanism is sometimes referred to as pause-based flow control. In another embodiment, the flow-control messages signal the peer port to pause packet transmission for a specified time period, and then resume transmission. This feature obviates the need for a separate resume message.

In an alternative embodiment, the flow-control messages initially inform the peer port of the receive buffer size, and then send update messages indicating the available buffer space. This sort of mechanism is sometimes referred to as credit-based flow control (CBF).

Consider packet transmission from a transmitting port to a receiving port. Typically, the receive buffer in the receiving port is configured such that the receiving port can achieve full wire-speed operation, i.e., such that the port bandwidth will not be limited by the receive buffer size.

The receive buffer size therefore typically depends on factors such as the port bandwidths (typically defined as the number of data bytes per second that the port is capable of transferring) of the transmitting and receiving ports, the maximum packet or frame size in the transmitting and receiving ports, the round-trip time between the receiving and transmitting ports, and the flow control processing time. In some embodiments, any of these parameters may change over time dynamically.

When using pause-based flow control, for example, a pause message should reach the transmitting port, and the transmitting port should process the pause message, before the receive buffer in the receiving port overflows. The additional amount of data received in the receiving port after the maximum receive buffer threshold has been exceeded is given by:

$$\text{additional data} = (\text{transmitting port } BW) \times (\text{delay before transmitting port stops transmitting data})$$

wherein the delay before the transmitting port stops transmitting data is given by:

delay before transmitting port stops transmitting data =

[(receiving port maximum packet or frame size)/

(receiving port $BW$)] + [round trip time] +

[pause transmit time] +

[(transmitting port maximum packet or frame size)/

(transmitting port $BW$)] + (transmitting port pause processing time)

and wherein the pause command transmit time is given by:

pause transmit time=pause size/receiving port send $BW$

As another example, when using CBF, the receive buffer in the receiving port should be large enough such that the transmitting port can sustain wire speed until a credit update message arrives. The minimum receive buffer size is therefore given by:

minimal buffer size=(2×transmitting port maximum packet or frame size)+(transmitting port $BW$)× (flow control processing delay)

wherein the flow control processing delay is given by:

flow control processing delay =

(round trip time) + (receiving port processing time) +

(receiving port maximum packet or frame size/ receiving port send $BW$) + (flow control transmit time)

wherein the flow control transmit time is given by:

flow control transmit time=flow control size/receiving port send $BW$

As can be seen from the above equations, the size of the receive buffer depends on the maximum packet or frame size. This dependence is due to an assumption that the receiving port transmits the flow-control messages at the packet or frame boundaries, i.e., that a flow-control message is delayed until the end of a currently-transmitted packet or frame.

In some embodiments that are explained in detail below, control circuitry 40A and 40B in switches 24A and 24B are able to temporarily suspend transmission of a packet in order to allow immediate transmission of a flow-control message. This mechanism effectively eliminates the dependence of the receive buffer size on the maximum packet or frame size, and therefore enables considerable reduction in the receive buffer size.

The system and switch configurations shown in FIG. 1 are example configurations, which are chosen purely for the sake of conceptual clarity. In alternative embodiments, any other suitable system and switch (or other communication equipment such as NIC) configurations can be used. Certain elements of switches 24A and 24B, e.g., ports 32A and 32B and some or all of control circuitry 40A and 40B, may be implemented using hardware, such as using one or more Application-Specific Integrated Circuits (ASICs) or Field-Programmable Gate Arrays (FPGAs). Alternatively, some switch elements may be implemented in software or using a combination of hardware and software elements.

In some embodiments, certain functions of the control circuitry may be implemented using a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Fast Transfer of Flow-Control Messages Using Temporary Packet Suspension

In some embodiments, control circuitry 40A and 40B is configured to optionally suspend transmission of a given packet in order to allow immediate transmission of a flow-control message. The description that follows refers to packet transmission from port 32A to port 32B, by way of example. Generally, the disclosed technique can be applied in the opposite direction, or in both directions.

In one embodiment, when control circuitry 40A identifies that a flow-control message is ready to be sent but a data packet is currently being transmitted, the control circuitry suspends the transmission of the data packet temporarily, then transmits the flow-control message, and then resumes the transmission of the data packet.

Control circuitry 40A in switch 24A may indicate the packet suspension and/or resumption to control circuitry 40B in switch 24B using any suitable method. In an embodiment, control circuitry 40A appends a dedicated marker, referred to as a suspension marker, to the end of the first portion of the data packet, at the point at which the data packet was suspended. The suspension marker signals to control circuitry 40B that the packet was suspended and that a flow-control message is now expected.

In some embodiments, after transmission of the flow-control message is completed, control circuitry 40A transmits another dedicated marker, referred to as a resumption marker, which indicates to control circuitry 40B that transmission of the data packet is now resumed. The suspension and resumption markers may comprise any suitable type of indication, such as dedicated symbols, symbol sequences or primitives.

Figure 2:
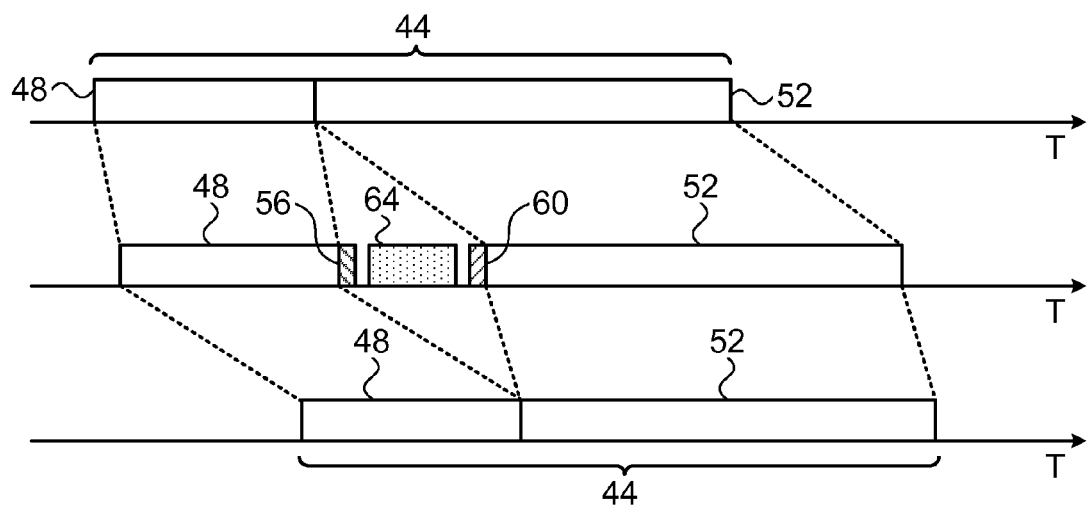
FIG. 2 is a diagram that schematically illustrates suspension of packet transmission for sending a flow-control message, in accordance with an embodiment of the present invention.

FIG. 2 is a diagram that schematically illustrates suspension of packet transmission for sending a flow-control message, in accordance with an example embodiment of the present invention. The top time-line in FIG. 2 shows a data packet 44 that is to be transmitted from port 32A to port 32B. After transmitting a first portion of packet 44, control circuitry 40A is ready to transmit a flow-control message 64 to port 32B.

The temporary suspension and resumption process of packet 44 is shown in the middle time-line of FIG. 2: At this point, circuitry 40A suspends the transmission of packet 44 and appends portion 48 with a suspension marker 56. Then (either immediately or possibly after a certain time gap) circuitry 40A transmits flow-control message 64.

After transmission of flow-control message 64 is complete (and possibly after a certain time gap), circuitry 40A resumes transmission of packet 44. In this example, circuitry 40A transmits a resumption marker 60 followed by a second portion 52 of data packet 44.

The bottom time-line of FIG. 2 shows the process of receiving data packet 44 in port 32B of switch 24B, in a disclosed embodiment. Control circuitry 40B receives flow-control message 64, and reassembles data packet 44 from portions 48 and 52.

As can be seen in the figure, the latency of receiving and processing the flow-control message is considerably reduced, relative to a scenario where the flow-control message has to be delayed until the end of the entire packet 44. As a result, the size of receive buffer 36B in port 32B can be reduced considerably.

The reduction in latency and buffer size is especially significant in slow links and/or when transmitting long data packets, for example when link 28 is asymmetric and only small bandwidth is allocated to the direction from port 32A to port 32B. Nevertheless, the disclosed technique is applicable in any other suitable link.

The example of FIG. 2 shows a single suspension/resumption operation applied to a given data packet. Generally, however, the control circuitry may suspend transmission of a given packet twice or more, for transmitting multiple flow-control messages. As yet another example, the control circuitry may use a single suspension to transmit two or more flow-control messages. In any of these configurations, any suitable type of flow-control message, such as the various pause-based or credit-based flow-control messages may be transmitted.

Figure 3:
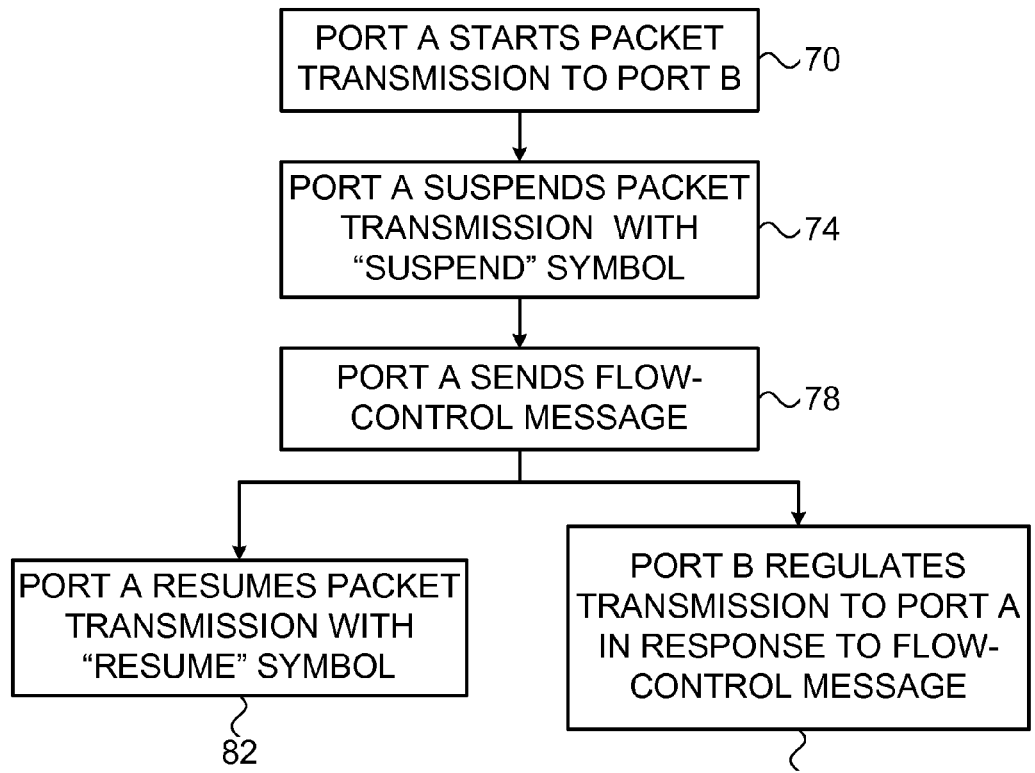
FIG. 3 is a flow chart that schematically illustrates a method for packet transmission, in accordance with an embodiment of the present invention.

FIG. 3 is a flow chart that schematically illustrates a method for packet transmission, in accordance with an embodiment of the present invention. The method begins with port 32A (denoted "port A") starting to transmit a data packet to port 32B (denoted "port B"), at a transmission initiation step 70.

When a flow-control message is ready for transmission from port A to port B, control circuitry 40A in port A suspends the transmission of the data packet using a suspension symbol, at a suspension step 74. Control circuitry 40A then causes port A to transmit the flow-control message, at a flow-control transmission step 78.

At this point, processing of the flow-control message in switch 24B and resumption of the packet transmission in switch 24A may be carried out simultaneously: Control circuitry 40A of port A resumes transmission of the data packet, at a resumption step 82. Control circuitry 40B of port B regulates the transmission of packets to port A as requested by the flow-control message, at a regulation step 86.

In some embodiments, the length of the suspension is agreed upon in advance by the control circuitry of ports A and B. In these embodiments, control circuitry 40B of port B resumes reception of the data packet after the predefined suspension time, without waiting for a resumption marker of any kind. The resumption marker in these embodiments may therefore be eliminated.

In some embodiments, control circuitry 40A suspends a currently-transmitted data packet whenever a flow-control message is ready for transmission. In other embodiments, control circuitry 40A evaluates a certain suspension condition that is defined over the data packet and/or flow-control message, and suspends the data packet only if the condition is met. Otherwise, control circuitry 40A waits until transmission of the data packet is completed, and only then transmits the flow-control message.

Control circuitry 40A may use any suitable suspension condition. For example, the control circuitry may suspend a data packet only if the remaining portion of the packet (the portion that is not yet transmitted when the flow-control message is ready) exceeds a certain size. The remaining size may be expressed in units of data (e.g., remaining bytes) or in units of remaining time.

As another example, the flow-control messages may be assigned two or more priority levels. In this embodiment, the control circuitry suspends a data packet only if the priority level of the pending flow-control message exceeds a certain threshold level. In this example, once all high-priority flow-control messages have been transmitted, control circuitry 40A resumes transmission of the suspended data packet. Any pending low-priority flow-control messages are transmitted subsequently to the data packet. In alternative embodiments, any other suitable suspension condition or combination of conditions can be used.

Forwarding of Suspended Packets

In some embodiments, the suspended and resumed data packet is forwarded from the receiving port to a subsequent destination. The subsequent destination may comprise a port in the same network element or in another network element. In the example above, the data packet is forwarded onwards from port 32B to a subsequent destination.

The control circuitry associated with the receiving port may forward the data packet in various ways. In some embodiments, the control circuitry may buffer at least the first portion of the data packet (portion 48) during the suspension period, so as to forward the reassembled packet contiguously. When using this "store and forward" mechanism, the subsequent destination receives a single contiguous data packet, and is typically unaware of the suspension and resumption operations applied to the packet. On the other hand, this technique involves additional buffering.

In an alternative embodiment, the control circuitry associated with the receiving port forwards the data packet to the subsequent destination with little or no buffering, while replacing the suspension period with dummy data. The dummy data is also referred to as "bubbles." The dummy data may comprise dedicated symbols or other primitive, or any other suitable data that is recognized by the subsequent destination as not belonging to the data packet.

When using this technique, the subsequent destination will receive the data packet with dummy data inserted thereto. The subsequent destination is typically configured to disregard and discard the dummy data, and to process the data packet regardless of the dummy data.

The use of dummy data reduces buffering resources in the receiving port and also reduces the latency caused by buffering the packet or parts of the packet. On the other hand, the subsequent destination should typically be aware of the dummy data mechanism. Alternatively, the control circuitry may exploit pre-specified or standardized characters that will be regarded by the subsequent destination as dummy data.

Figure 4:
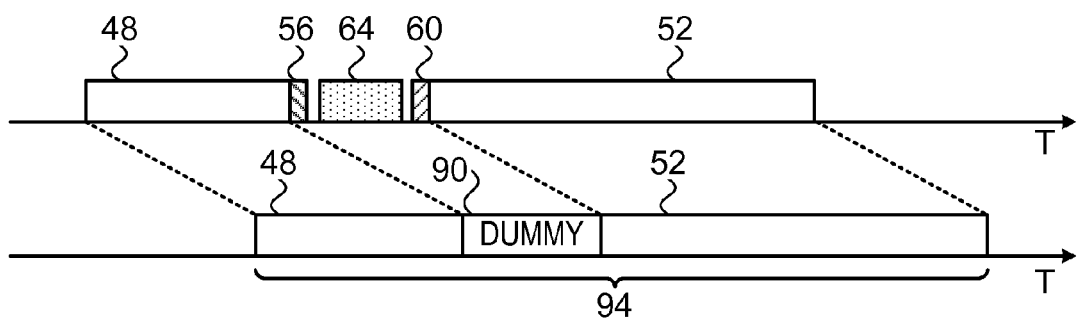
FIG. 4 is a diagram that schematically illustrates forwarding of a packet using dummy data, in accordance with an embodiment of the present invention.

FIG. 4 is a diagram that schematically illustrates forwarding of a packet using dummy data, in accordance with an example embodiment of the present invention. The top time-line in FIG. 4 shows the data packet as it is transmitted by the transmitting port and received by the receiving port. The bottom time-line shows the data packet as it is forwarded from the receiving port to the subsequent destination.

As can be seen in the figure, the control circuitry associated with the receiving port replaces the suspension period (including the suspension and resumption markers if used) with dummy data 90. The subsequent destination thus receives a longer data packet 94, which has dummy data 90 inserted between portion 48 and portion 52.

In alternative embodiments, the data packet suspension time (and thus the time allocated for transmission of the flow-control messages during suspension) is bounded to a certain maximum value. The receiving port in these embodiments is configured to buffer a sufficient part of the data packet, such that the packet forwarding is unaffected by the suspension/resumption operations. The data packet in these embodiments is forwarded from the receiving port as received, i.e., including the suspension period.

Although the embodiments described herein mainly address lossless communication protocols, the methods and systems described herein can also be used in any other communication applications including lossy communication protocols.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   transmitting data packet from a first port to a second port over an Ethernet or Infiniband communication link;
   after transmission of a first portion of the data packet, temporarily suspending the transmission, sending a flow-control message from the first port to the second port over the Ethernet or Infiniband communication link while the transmission is temporarily suspended, and then resuming the transmission so as to transmit a second portion of the data packet; and
   forwarding the data packet from the second port to a subsequent destination, the forwarded packet including dummy data inserted by circuitry at the second port at the time of the temporary suspension, between the first and second portions.

2. The method according to claim 1, wherein sending the flow-control message comprises requesting the second port to regulate data transfer over the Ethernet or Infiniband communication link from the second port to the first port.

3. The method according to claim 1, wherein suspending the transmission comprises appending a suspension marker to the first portion of the data packet.

4. The method according to claim 1, wherein resuming the transmission comprises preceding the second portion of the data packet with a resumption marker.

5. The method according to claim 1, wherein suspending the transmission comprises pausing the transmission for no more than a maximum predefined suspension period, and wherein resuming the transmission comprises continuing the transmission upon expiry of the maximum predefined suspension period.

6. The method according to claim 1, wherein suspending the transmission comprises evaluating a suspension condition, and suspending the transmission only when the suspension condition is met.

7. The method according to claim 6, wherein evaluating the suspension condition comprises identifying that the second portion of the data packet exceeds a predefined size.

8. The method according to claim 6, wherein evaluating the suspension condition comprises identifying that the flow-control message is assigned a priority level that is higher than a predefined priority threshold.

9. The method according to claim 1, and comprising receiving the first and second portions at the second port, and reassembling the data packet from the received first and second portions.

10. The method according to claim 9, and comprising, at the second port, regulating data transfer over the Ethernet or Infiniband communication link from the second port to the first port in response to the flow-control message, and simultaneously processing the reassembled data packet.

11. The method according to claim 1, wherein suspending the transmission comprises pausing the transmission for no more than a maximum predefined suspension period, and wherein forwarding the data packet comprises forwarding the data packet including the suspension period.

12. The method according to claim 1, wherein forwarding the packet including dummy data is performed by the second port with little or no buffering.

13. The method according to claim 1, wherein between transmitting the first portion of the data packet and transmitting the flow-control message, the first port transmits a suspension marker, and comprising identifying, by the second port, the suspension marker in the transmission from the first port and inserting the dummy data into the forwarded data packet, by the second port, responsively to identifying the suspension marker.

14. A communication apparatus, comprising:
   a port, which is connected to a remote port by an Ethernet or Infiniband communication link and is configured to transmit data packet to the remote port over the Ethernet or Infiniband communication link;
   control circuitry, which is coupled to the port and is configured to temporarily suspend the transmission of the data packet after transmission of a first portion of the data packet, to send a flow-control message to the remote port over the Ethernet or Infiniband communication link while the transmission is temporarily suspended, and then to resume the transmission so as to transmit a second portion of the data packet; and
   remote circuitry, which is coupled to the remote port and is configured to forward the data packet including dummy data inserted between the first and second portions at the time of the temporary suspension, to a subsequent destination.

15. The apparatus according to claim 14, wherein, by sending the flow-control message, the control circuitry is configured to request the remote port to regulate data transfer over the Ethernet or Infiniband communication link from the remote port to the port.

16. The apparatus according to claim 14, wherein the control circuitry is configured to append a suspension marker to the first portion of the data packet.

17. The apparatus according to claim 14, wherein the control circuitry is configured to precede the second portion of the data packet with a resumption marker.

18. The apparatus according to claim 14, wherein the control circuitry is configured to suspend the transmission for no more than a maximum predefined suspension period, and to resume the transmission upon expiry of the maximum predefined suspension period.

19. The apparatus according to claim 14, wherein the control circuitry is configured to evaluate a suspension condition, and to suspend the transmission only when the suspension condition is met.

20. The apparatus according to claim 19, wherein the control circuitry is configured to evaluate the suspension condition by identifying that the second portion of the data packet exceeds a predefined size.

21. The apparatus according to claim 19, wherein the control circuitry is configured to evaluate the suspension condition by identifying that the flow-control message is assigned a priority level that is higher than a predefined priority threshold.

22. The apparatus according to claim 14, wherein the remote port is configured to receive the first and second portions, and comprising remote circuitry, which is coupled to the remote port and is configured to reassemble the data packet from the received first and second portions.

23. The apparatus according to claim 22, wherein the remote circuitry is configured to regulate data transfer over the Ethernet or Infiniband communication link from the remote port to the port in response to the flow-control message, and to simultaneously process the reassembled data packet.

24. The apparatus according to claim 14, wherein the control circuitry is configured to suspend the transmission for no more than a maximum predefined suspension period, and wherein the remote circuitry is configured to forward the data packet including the suspension period.

25. A method for communication, comprising:
receiving over an Ethernet or Infiniband communication link a first portion of data packet, followed by a flow-control message, followed by a second portion of the data packet;
reassembling the data packet from the first and second received portions and processing the reassembled data packet;
extracting and executing the flow-control message;
inserting into the received data packet dummy data between the first and second portions for the duration of the flow-control message, and
forwarding the data packet including the dummy data to a subsequent destination.

26. A communication apparatus, comprising:
a port, which is configured to receive over a Ethernet or Infiniband communication link a first portion of data packet, followed by a flow-control message, followed by a second portion of the data packet; and
control circuitry, which is coupled to the port and is configured to reassemble the data packet from the first and second received portions and, to process the reassembled data packet, to extract and execute the flow-control message, to insert into the received data packet dummy data between the first and second portions for the duration of the flow-control message, and to forward the data packet including the dummy data to a subsequent destination.

* * * * *